Oct. 20, 1931.   F. HORNBY   1,828,045
CONSTRUCTIONAL TOY
Filed May 2, 1928   3 Sheets-Sheet 1
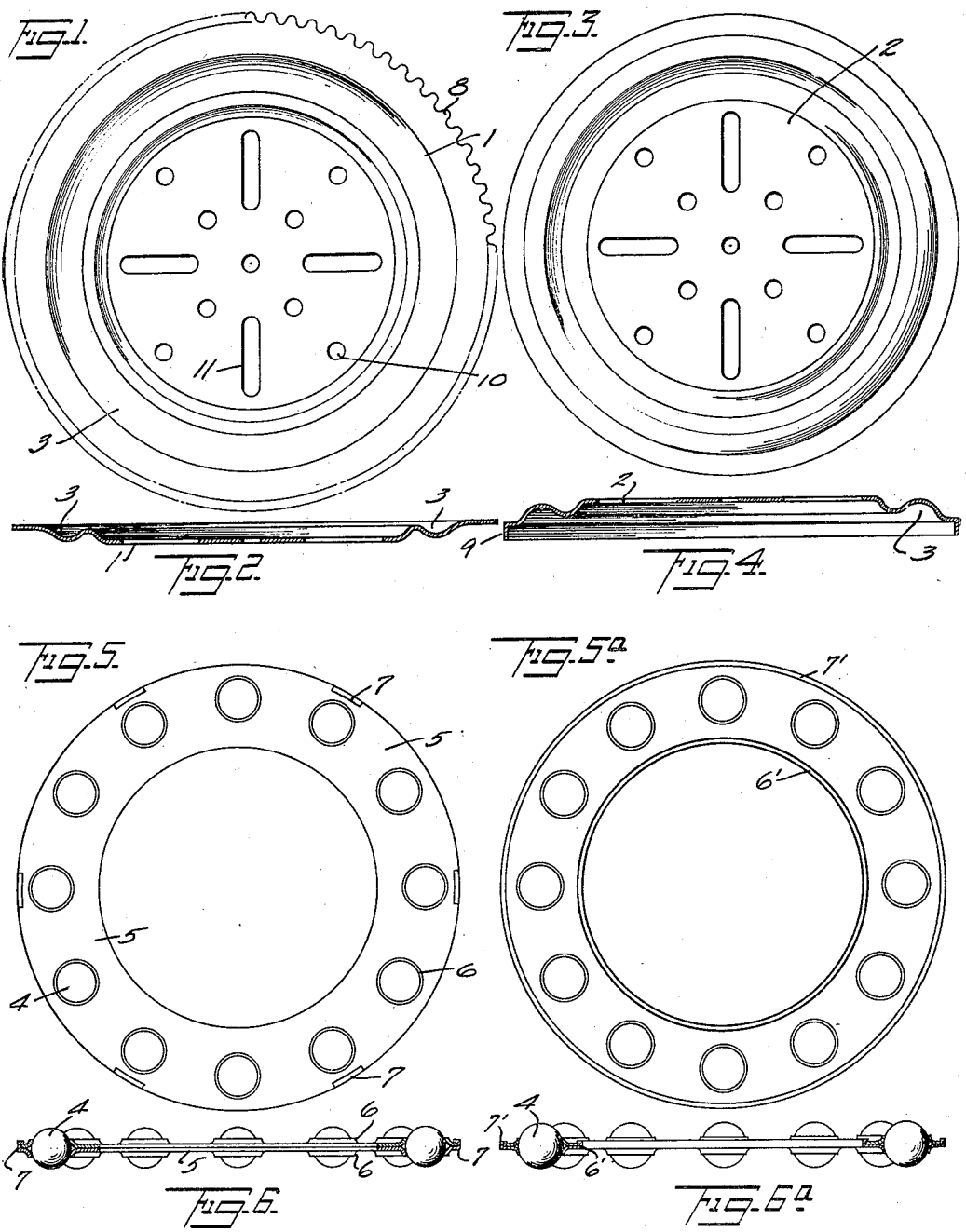

Oct. 20, 1931.   F. HORNBY   1,828,045
CONSTRUCTIONAL TOY
Filed May 2, 1928   3 Sheets-Sheet 2
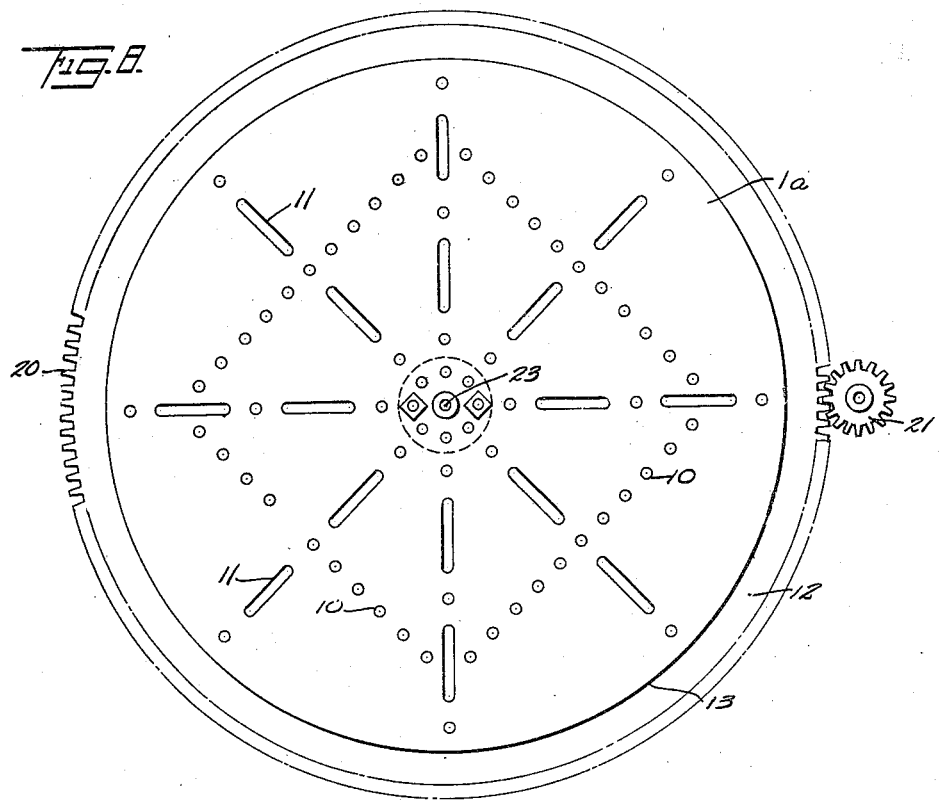
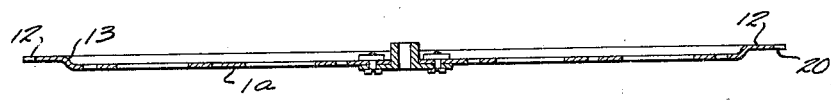
INVENTOR
Frank Hornby
BY
ATTORNEY Oct. 20, 1931.  F. HORNBY  1,828,045
CONSTRUCTIONAL TOY
Filed May 2, 1928    3 Sheets-Sheet 3
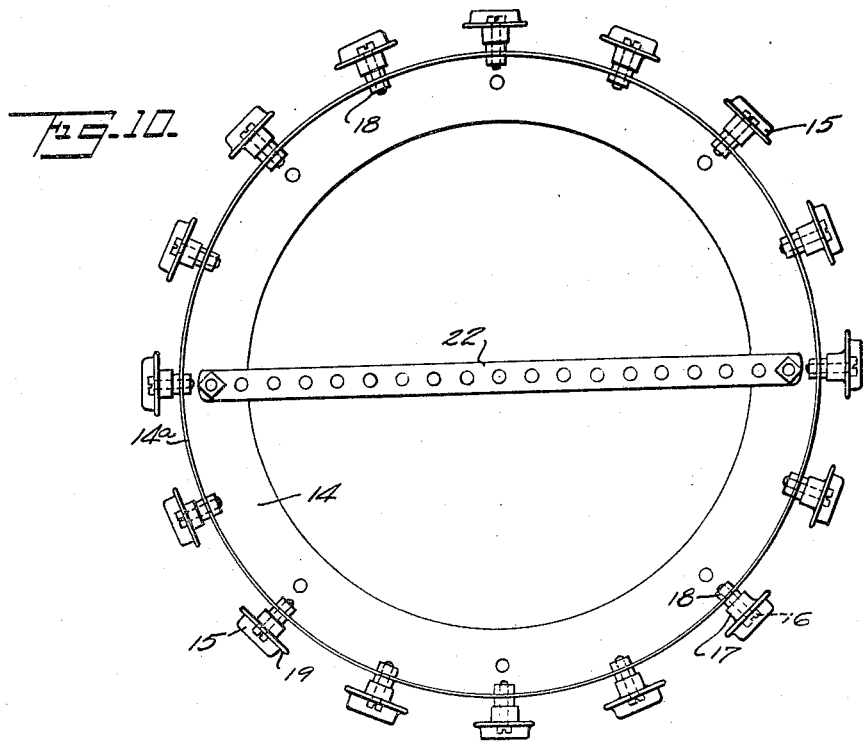
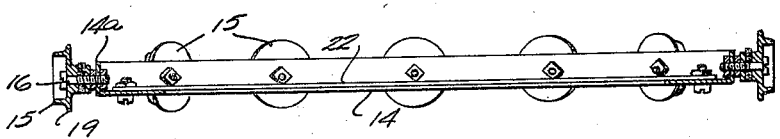
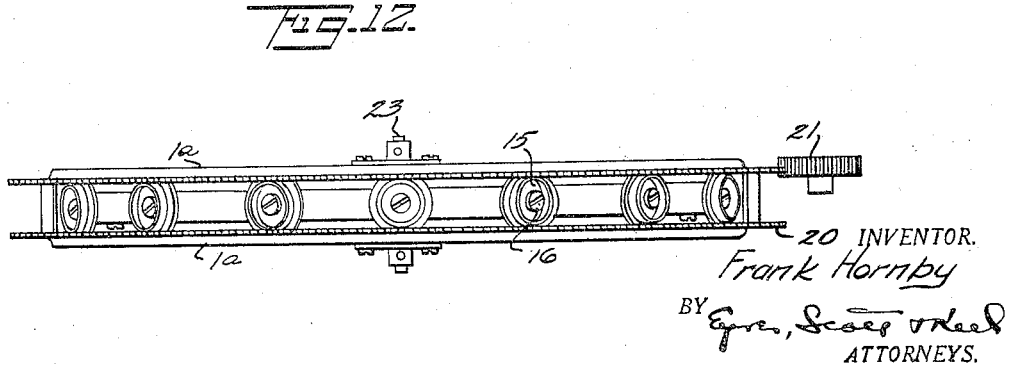
INVENTOR.
Frank Hornby
BY
ATTORNEYS.

Patented Oct. 20, 1931

1,828,045

UNITED STATES PATENT OFFICE

FRANK HORNBY, OF LIVERPOOL, ENGLAND, ASSIGNOR, BY MESNE ASSIGNMENTS, TO THE A. C. GILBERT COMPANY, OF NEW HAVEN, CONNECTICUT, A CORPORATION OF MARYLAND

CONSTRUCTIONAL TOY

Application filed May 2, 1928, Serial No. 274,445, and in Great Britain November 25, 1927.

This invention relates to a novel and improved arrangement and construction of rolling bearing units and parts specially applicable for use in the building up of constructional models or toys. The invention is directed to a construction of rolling bearing and race unit such that the parts thereof may be made up from stamped sheet metal and adapted to be built into models made from interchangeable parts such as perforated strips and plates connected by bolts and nuts. To this end I have devised a rolling bearing unit including two outer specially formed sheet metal disc parts or raceways, one or both of which are provided with gear teeth on the peripheral edge, and a cooperating intermediate cage element carrying balls or rollers, which is also formed of sheet metal of a novel construction.

As applied to rolling bearings of the ball type the races are made of stamped sheet metal discs having annular channels of curved or V-section. Two such channel discs are provided for each bearing engaging opposite sides of the balls. The ball cage is made of two sheet metal rings in which are stamped a number of flanged holes forming conical dishings. Two such rings reversed are placed together to retain the balls in the ring cages, the conical flanges forming housings for the balls. The ball rings are secured together in any suitable manner as for example by riveting or otherwise. For a heavier type of rolling unit rollers instead of balls may be used and in this case the disc races are stamped with a peripheral edging raised above the plane of the disc to form an annular shoulder. The roller cage consists of an angled section ring on the peripheral flange of which rollers are mounted upon studs secured by nuts or riveting to the angle ring. The rollers are preferably flanged, the tread of the roller running on the raised peripheral edge of the race discs and the flanges engaging the shoulders. In both the ball and roller type of bearing the discs may be formed with slots and circular holes to enable the elements to be connected up interchangeably to other parts of a toy model. One or both of the race discs may be toothed to enable it to be driven by a sprocket chain or pinion.

For a better understanding of my invention reference may be had to the accompany drawings wherein Figs. 1 to 7 show my invention embodied in a unit of the ball type and Figs. 8 to 12 a roller bearing unit. Fig. 1 is a plan and Fig. 2 a cross section of a geared race disc, Fig. 3 being a plan and Fig. 4 a cross section of the opposite flanged race disc. Fig 5 is a plan and Fig. 6 a cross section of the ball cage, and Figs. 5a and 6a are illustrations of a modified form. Fig. 7 is an end view of a complete ball bearing unit the left hand side of the figure being in section and the right hand side in elevation. Fig. 8 is a plan of a geared race disc for a roller bearing, Fig. 9 being a cross section. Fig. 10 is a plan of the roller cage and Fig. 11 is a cross section. Fig. 12 is an end view of the complete roller bearing.

In carrying out the invention as applied to the construction of ball bearings, Figs. 1 to 7 inclusive, the two ball races are made of stamped sheet metal discs 1, 2, each having an annular channel 3 which may be of curved section as shown or of V-section. These annular channels may be formed in the discs or rings by the operation of press tools. As shown in Fig. 7 two such discs or rings are provided for each bearing, the channels 3 engaging opposite sides of the balls 4 of the ball race, the diameter of the balls 4 and the form of the plates 1, 2 being such that the latter do not contact when assembled to form a bearing. The ball cage or frame, Figs. 5 and 6, is made up of two similar sheet metal rings 5 in which are stamped a number of holes corresponding to the number of balls 4 to be housed, the holes being formed with short flanges 6 preferably inclined to the plane of the ring, the flanges thus forming shallow conical dishings (see Fig. 6) stamped out from the metal of the rings. Two such rings reversed are placed together to enclose the balls and retain them in position in the ring cage, the conical flanges 6 around the apertures forming a housing which securely holds the ball in position the latter projecting well above each edge of the flanges 6 of the ring cage. The rings may be secured together by riveting, eyeleting, or as shown by forming nibs or projections 7 on one ring which are bent over the adjoining edge of the other ring. In Figs. 5a and 6a I have shown the outer peripheral edge 7' of one disc ring turned around the edge of the other, and also the inner peripheral edge 6' of the same ring element turned about and engaging the corresponding inner edge of the other, thereby forming a firm and rigid connection between them. A ball ring cage constructed as described is then inserted between the two annularly channelled discs or rings to form a complete ball bearing. Such a ball bearing is of considerable advantage in the building up of constructional models from interchangeable parts as for instance to form the footstep of a jib crane.

The race discs or rings may be formed on their periphery with a toothed edge 8, Fig. 1, to enable the one element of the ball bearing to be driven upon the other element; and preferably one of the discs is toothed in this way at its edge while the other is formed with an upstanding flange 9, Fig. 4, which when the bearing is assembled more or less encloses the balls, Fig. 7. The race discs of the ball bearing may be perforated with holes 10 spaced apart at some standard pitch and/or slots 11 to enable such elements readily to be connected up to other parts of a toy building outfit by bolts and nuts and so built in to the models to be constructed.

For use in the heavier class of model where it is desirable to have roller instead of ball bearings, the race discs 1a, Figs. 8, 9 and 12, instead of being stamped with an annular channel are preferably provided near the periphery with a peripheral edging 12 parallel to but raised above the plane of the disc or ring, an annular shoulder 13 being thus formed around each disc, the edge 12 and the shoulder 13 thus forming the race-way for the rollers. The roller cage or frame consists of a ring 14, Figs. 10 and 11, of angled section the rollers 15 being pivotally carried on the peripheral flange 14a of this ring. Preferably the rollers are mounted upon studs 16 which pass through bosses 17 on the rollers and are secured by nuts 18 to the angle section ring, the bolts or studs being radially disposed to the roller frame. The rollers are preferably flanged at 19 on one side of their tread, the tread of the roller running on the raised peripheral edge 12 of the race disc and the flange engaging the shoulder 13. As in the case of the ball race the discs 1a may be formed with slots 11 and circular holes 10 spaced apart at some standard pitch to enable the elements to be connected up interchangeably to other parts of the toy outfit and one or both of the race discs may be toothed on its periphery as shown at 20, Fig. 8, to enable it to be driven by a sprocket chain or pinion 21 engaging therewith. The roller frame may be further centralised in the bearing by fitting a perforated strip 22 diametrically across the frame, the central perforation of the strip engaging the usual axial rod 23 which passes through the two discs and the intervening roller frame when assembled to form a unit, as shown in Fig. 12. This latter form of roller bearing is suitable for building up the heavier type of constructional toy for use in demonstration models for shop windows or the like situations.

Having now particularly described and ascertained the nature of my said invention and in what manner the same is to be performed, I declare that what I claim is:—

1. A rolling bearing unit for use with constructional toys comprising stamped sheet metal upper and lower discs having mating races for the rolling elements formed therein and an intermediate stamped sheet metal cage or frame carrying the rolling elements in engagement with said mating races, one of said discs being provided with a series of perforations for variable connection of the unit as a part of constructional toys.

2. A rolling bearing unit for use with constructional toys comprising stamped sheet metal upper and lower discs having mating races for the rolling elements formed therein and an intermediate stamped sheet metal cage or frame carrying the rolling elements in engagement with said mating races, one race disc being provided with an upstanding flange for the purpose described.

3. A rolling bearing unit for use with constructional toys comprising stamped sheet metal upper and lower discs having mating races for the rolling elements formed therein and an intermediate stamped sheet metal cage or frame carrying the rolling elements in engagement with said mating races, the rolling elements being of the flanged roller type and the race-way discs being provided with peripheral edges resting above the planes of the respective discs with annular shoulders formed thereon for engagement with the flanged rollers.

4. A rolling bearing unit for use with constructional toys comprising stamped sheet metal upper and lower discs having mating races for the rolling elements formed therein and an intermediate stamped sheet metal cage or frame carrying the rolling elements in engagement with said mating races, the cage or element carrying the rolling elements being in the form of a sheet metal piece having a circular angle section formed on the peripheral edge thereof on which a series of rolling elements is carried.

5. A rolling bearing unit for use with constructional toys comprising stamped sheet metal upper and lower discs having mating races for rolling elements formed therein and an intermediate stamped sheet metal cage or frame carrying the rolling elements in engagement with said mating races, one of said discs being provided with a series of perforations for variable connection of the unit as a part of constructional toys and one of said discs having a toothed peripheral edge for functioning as a gear element.

6. A rolling bearing unit for use with constructional toys comprising stamped sheet metal upper and lower discs having mating races for the rolling elements formed therein and an intermediate stamped sheet metal cage or frame carrying the rolling elements in engagement with said mating races, each of said discs being provided with a predetermined series of perforations for ready connection of the unit as a part of constructional toys and one of said discs being formed with a toothed peripheral edge functioning as a gear element.

In testimony whereof, I have signed my name to this specification.

FRANK HORNBY.